(12) United States Patent
Kato et al.

(10) Patent No.: US 6,545,972 B1
(45) Date of Patent: Apr. 8, 2003

(54) PRE-PIT DETECTOR OF OPTICAL RECORDING MEDIUM

(75) Inventors: Masahiro Kato, Tokorozawa (JP); Masayoshi Yoshida, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 173 days.

(21) Appl. No.: 09/610,690

(22) Filed: Jul. 7, 2000

(30) Foreign Application Priority Data

Jul. 8, 1999 (JP) .......................................... 11-195115

(51) Int. Cl.$^7$ ................................................ G11B 7/00
(52) U.S. Cl. ................................................ 369/124.12
(58) Field of Search ....................... 369/124.07, 124.1, 369/124.11, 124.12, 44.26, 44.35, 44.36, 44.41, 59.15, 59.25, 59.23, 47.27

(56) References Cited

U.S. PATENT DOCUMENTS

| | | | |
|---|---|---|---|
| 5,339,302 A | 8/1994 | Takahisha et al. ............. | 369/54 |
| 5,696,752 A | 12/1997 | Hajjar et al. ................. | 369/124 |
| 5,978,333 A * | 11/1999 | Kobayashi et al. ...... | 369/44.35 |
| 6,058,093 A * | 5/2000 | Kato et al. ............. | 369/124.14 |
| 6,181,657 B1 * | 1/2001 | Kuroda et al. ............ | 369/44.41 |
| 6,337,838 B1 * | 1/2002 | Hikima et al. ......... | 369/124.07 |
| 6,339,581 B1 * | 1/2002 | Yoshida et al. ........ | 369/124.12 |

FOREIGN PATENT DOCUMENTS

| | | |
|---|---|---|
| EP | 0607445 A1 | 7/1994 |
| EP | 0862171 A2 | 9/1998 |
| EP | 0874357 A2 | 10/1998 |
| EP | 0987687 A2 | 3/2000 |
| JP | 10-283638 | 10/1998 |

* cited by examiner

Primary Examiner—Thang V. Tran
(74) Attorney, Agent, or Firm—Morgan, Lewis & Bockius LLP (57) ABSTRACT

A pre-pit detector comprises an optical detector which receives a reflected beam of an optical beam irradiated to the write surface by first and second light reception surfaces, which are split light reception surfaces, to output first and second optical detection signals corresponding to reception light intensities of the respective first and second light reception surfaces and receives the reflected beam from a pre-pit track pairing up with an information write track to which the optical beam is irradiated, on the first light reception surface. The first optical detection signal is given with an amplification result by a greater gain than the second optical detection signal to supply the first and second optical detection signals to a subtractor which computes the difference between the first and second optical detection signals. The output signal of the subtractor is digitized to generate a pre-pit detection signal.

4 Claims, 14 Drawing Sheets

| G1 | G2 | G1/G2 | APmin | APmax | AR [%] |
|---|---|---|---|---|---|
| 3.3 | 3.9 | 0.85 | 0 | 333 | 0.00 |
| 3.6 | 3.9 | 0.92 | 9 | 347 | 2.59 |
| 3.9 | 3.9 | 1.00 | 34 | 342 | 9.94 |
| 4.3 | 3.9 | 1.10 | 50 | 330 | 15.15 |
| 4.7 | 3.9 | 1.21 | 78 | 328 | 23.78 |
| 5.1 | 3.9 | 1.31 | 81 | 318 | 25.47 |
| 5.6 | 3.9 | 1.44 | 59 | 281 | 21.00 |
| 6.2 | 3.9 | 1.59 | 27 | 230 | 11.74 |
| 6.8 | 3.9 | 1.74 | 0 | 208 | 0.00 |

RADIAL PUSH-PULL SIGNAL

RADIAL PUSH-PULL SIGNAL

RADIAL PUSH-PULL SIGNAL

RADIAL PUSH-PULL SIGNAL

FIG.18B

PRE-PIT DETECTOR OF OPTICAL RECORDING MEDIUM

BACKGROUND OF THE INVENTION

1. Field of the Invention

The present invention relates to a pre-pit detector of an optical recording medium capable of writing data, such as a DVD-R.

2. Description of the Related Art

A write-once type DVD (Digital Versatile Disc or Digital Video Disk) has already become practical as an optical recording medium capable of writing data. A rewritable DVD-RW has also been studied for practical use.

Figure 1:
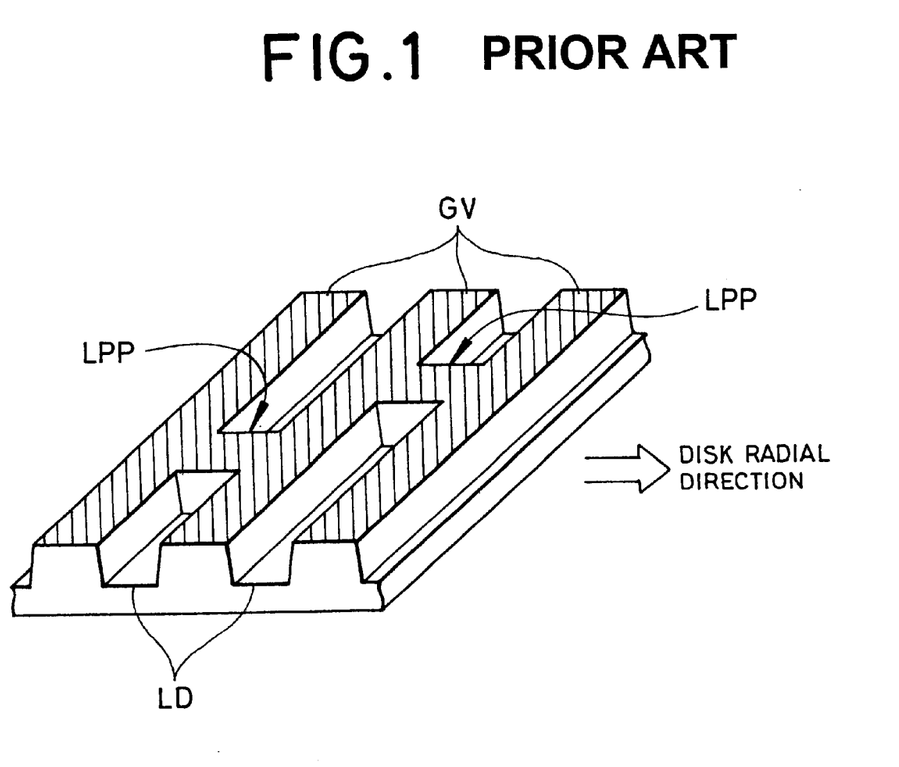
FIG. 1 shows a part of a write surface of a DVD.

FIG. 1 is a perspective view showing the structure of a write surface of a DVD-R or DVD-RW (which will be hereinafter called merely the "DVD" and its section. FIG. 1 shows the state before an information read/write apparatus writes information data (audio data, image data and computer data).

Protuberant groove tracks GV (data write track) and recessed land tracks LD (pre-pit tracks) are alternately formed either spirally or concentrically on a write surface of a DVD before information data is written, as shown in FIG. 1.

A plurality of land pre-pits LPP which represent addresses representing each position on the groove track GV and which give the write timing are previously formed on each land track LD. Each of the land pre-pits LPP takes the form of interconnecting adjacent groove tracks GV, and its surface (the surface indicated by oblique lines) is located on the same plane as the surface of the groove tracks GV.

An information write/read apparatus for writing the information data to the DVD, irradiates a write beam corresponding to the information data to the groove track GV while detecting the land pre-pit LPP from the DVD and recognizing the position on the groove track GV. By heat transfer to a region to which the write beam is irradiated, an information pit is formed in the region.

Figure 2:
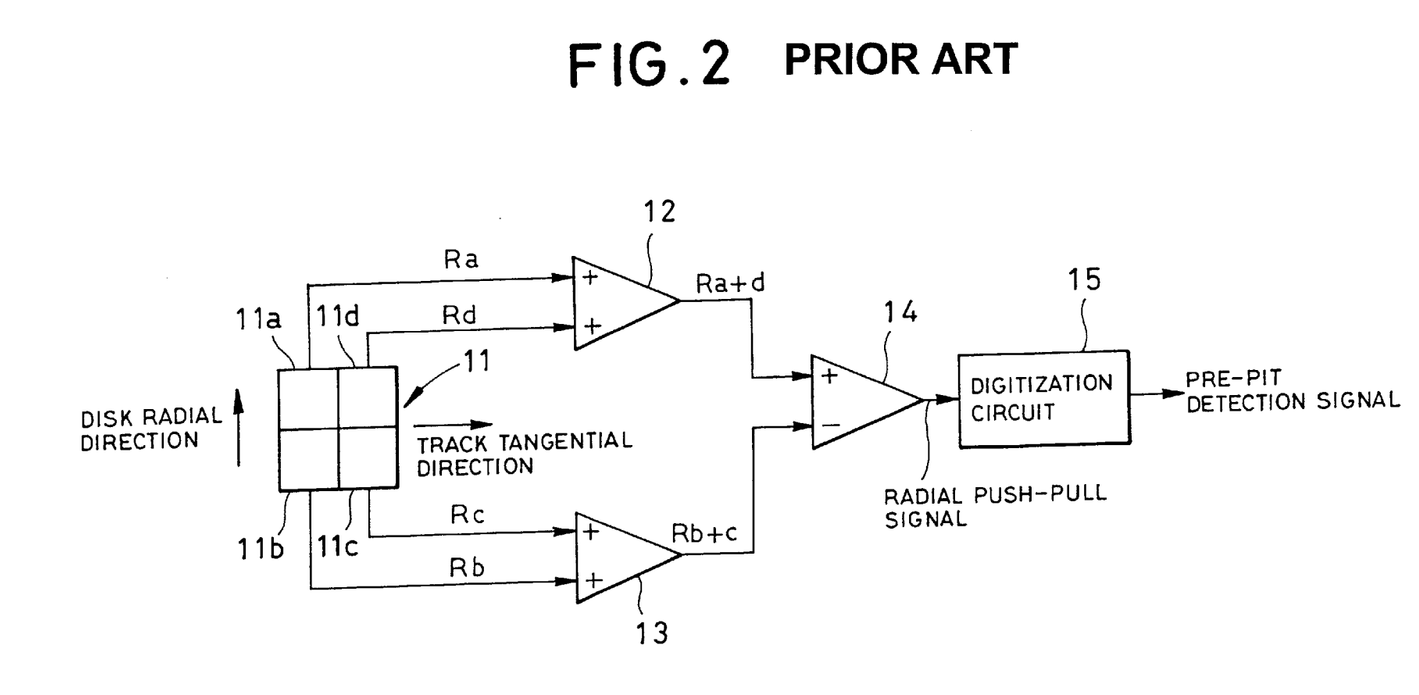
FIG. 2 is a block diagram showing the construction of a pre-pit detector according to the prior art.

A pre-pit detector for detecting the land pre-pit includes a four-split optical detector 11 as shown in FIG. 2. The four-split optical detector 11 comprises a photo-electric conversion device having light reception surfaces 11a to 11d that are divided into four parts by directions extending along the information write tracks (groove tracks GV) of the DVD and by the directions orthogonal to the write tracks. The light reception surfaces 11a and 11d are positioned on the outer circumferential side of the disk and the light reception surfaces 11b and 11c, on the disk inner circumferential side.

The read beam is irradiated by a read beam generator to the DVD driven for rotation by a spindle motor, forming an information-reading spot on the write surface of the DVD. The photo-electric conversion device receives the beam reflected from the forming region of the information-reading spot on the DVD, on each of the four light reception surfaces 11a to 11d, and outputs light reception signals Ra to Rd as electric signals corresponding to the reception light intensity of the reception light surfaces 11a to 11d. The light reception signals Ra and Rd corresponding to the respective light reception surfaces 11a and 11d positioned on the disk outer circumferential side are applied to an adder 12. The light reception signals Rb and Rc corresponding to the light reception surfaces 11b and 11c on the disk inner circumferential side are applied to an adder 13. The adder 12 adds the light reception signals Ra and Rd and the adder 13 adds the light reception signals Rb and Rc. Furthermore, a subtractor 14 subtracts the output signal of the adder 13 from the output signal of the adder 12, and the output signal of the subtractor 14 is obtained as a radial push-pull signal.

Figure 3:
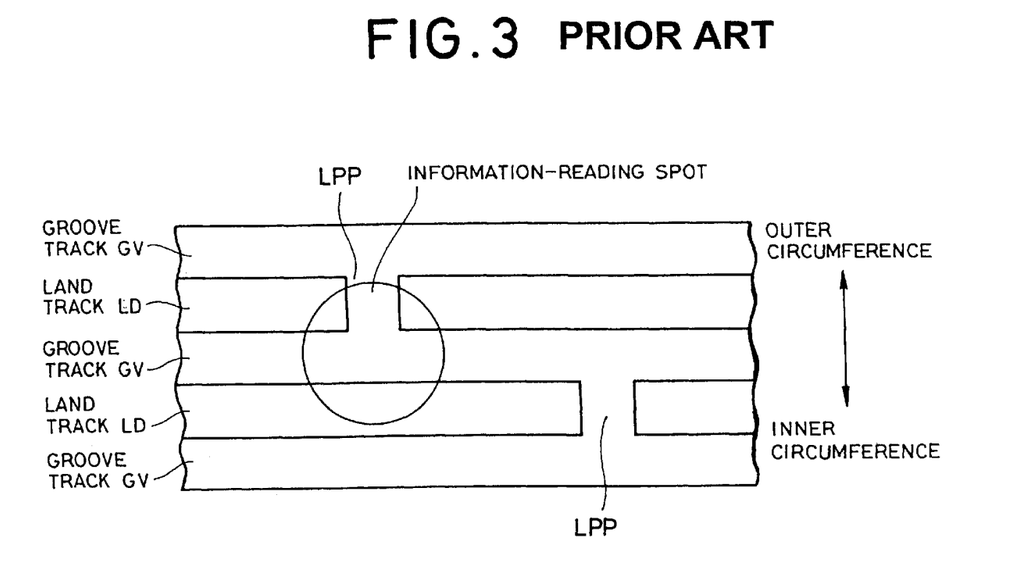
FIG. 3 is a view showing an optical beam spot irradiated to, and formed on, a groove track including a land pre-pit on the write surface of the DVD.
Figure 4:
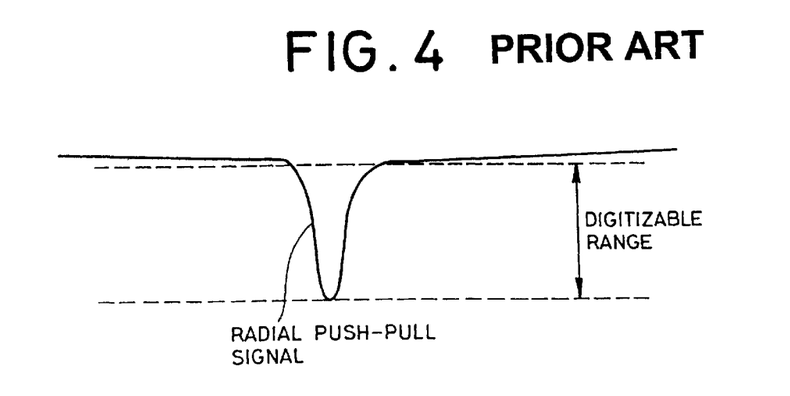
FIG. 4 is a view showing a digitizable range of a radial push-pull signal.

It will be assumed hereby that an information-reading spot by a beam irradiated as shown in FIG. 3 exists at a position that contains a land pre-pit LPP with one groove a track GV located in the center of the information-reading spot on a DVD to which no information data is written at all. In the case, since the reflected light intensity to the light reception surfaces 11a and 11d of the optical detector 11 decreases due to diffraction of the optical beam, and the reflected light intensity to the light reception surfaces 11b and 11c increases, the level of the output signal of the adder 12 decreases to a level lower than that of the output signal of the adder 13. Therefore, the radial push-pull signal issued from the subtractor 14 has a waveform having a sharp valley as shown in FIG. 4 in response to the land pre-pit LPP. The radial push-pull signal is supplied to a digitizing circuit 15 and is digitized at a predetermined threshold value, so that the land pre-pit LPP is detected.

The land pre-pits LPP having the information such as the address of one track are formed on the outer circumferential side of the track. Therefore, each of the land pre-pits LPP on the outer circumferential side is detected as shown in FIGS. 3 and 4.

Figure 5:
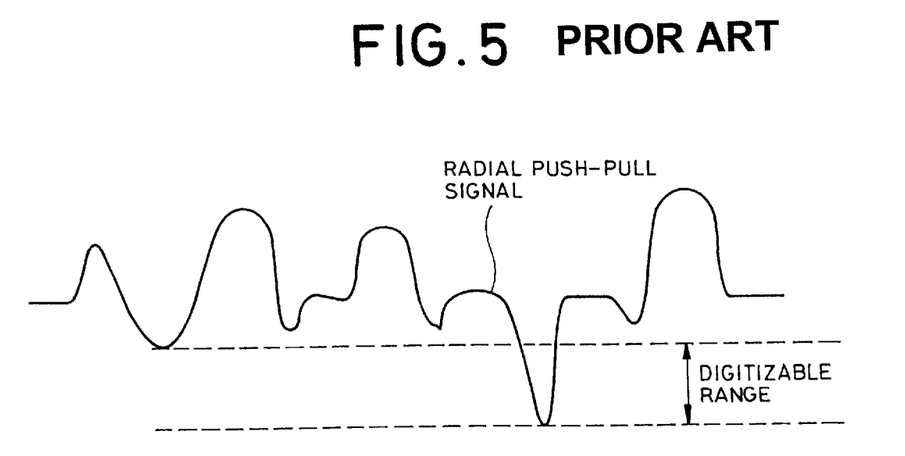
FIG. 5 is a waveform diagram showing a radial push-pull signal affected by the influences of the leak of the information data components from adjacent tracks and the fluctuation in a radial direction of an information-reading spot.

However, when the pre-pit detector described above detects the land pre-pit LPP from a DVD on which information data is written, and the reflected light intensity at the time of detection of the land pre-pit LPP adjacent to the write mark portion decreases as will be described later. The digitizable range of the radial push-pull signal issued at the time becomes narrow. Further, the information data components of the adjacent tracks leak into the radial push-pull signal, and the information-reading spot deviates from the track center by an error occurred in tracking control for the information-reading spot. For these reasons, the radial push-pull signal fluctuates greatly as if a land pre-pit LPP was detected during the period in which the land pre-pit does not exist as shown in FIG. 5, the digitizable range becomes also narrow. The digitizable range exists between the peak value of the radial push-pull signal corresponding to the land pre-pit LPP and the peak value of the period in which the land pre-pit does not exist, as shown in FIG. 5. As the digitizable range becomes narrower, setting of the threshold value for digitization becomes more difficult, and the land pre-pit LPP cannot be detected correctly.

SUMMARY OF THE INVENTION

It is therefore an object of the present invention to provide a pre-pit detector that can expand a digitizable range of a radial push-pull signal irrespective of leak of information data components from adjacent tracks and irrespective of the deviation of the balance due to a tracking error of an information-reading spot, and can correctly detect the pre-pit.

A pre-pit detector for an optical recording medium including a write surface on which an information write track for forming information pits carrying information data and pre-pit track previously having a plurality of pre-pits carrying information associated with the information write track are repeatedly formed in pairs, comprising: optical detection means having light reception surfaces split as first and second light reception surfaces in a tangential direction of the track, for receiving a reflected light of an optical beam irradiated to the write surface on the first and second light reception surfaces so as to output first and second optical detection signals corresponding to light reception intensities of the first and second light reception surfaces, and for receiving the reflected beam from the pre-pit track pairing up with the information write track to which the optical beam is irradiated, on the first light reception surface; subtraction means for computing a difference between the first and second optical detection signals generated from the optical detection means; and digitization means for digitizing the output signal of the subtraction means so as to generate the pre-pit detection signal, wherein the optical detection means has amplification means for giving to the first optical detection signal an amplification result by a greater gain in comparison with the second optical detection signal so as to output the first and second optical detection signals to the subtraction means.

The construction described above can expand the digitizable range of the radial push-pull signal as the output signal of the subtraction means even when the leak of the information data components from the adjacent tracks exists, or when the variation of the balance resulting from the tracking error of the information-reading spot exists. Since the construction makes it easier to set the threshold value for digitization, the pre-pits of the pre-pit track can be detected more correctly.

DETAILED DESCRIPTION OF THE PREFERRED EMBODIMENT

Hereinafter, preferred embodiments of the present invention will be explained in detail with reference to the accompanying drawings.

Figure 6:
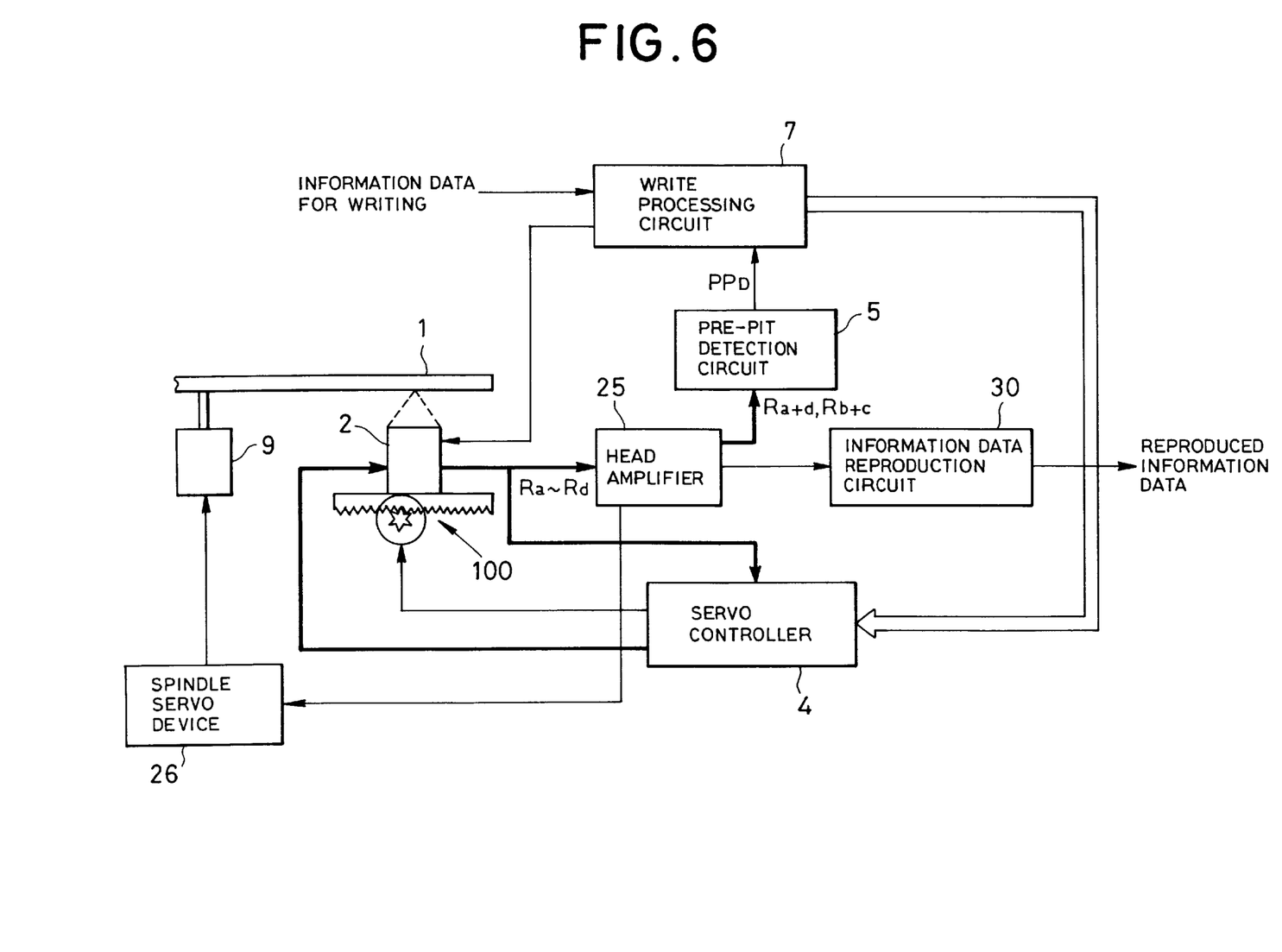
FIG. 6 is a block diagram showing an information write/read apparatus to which the pre-pit detector according to the present invention is applied.

FIG. 6 shows an information write/read apparatus that applies a pre-pit detector according to the present invention. A write beam generator (not shown) for writing information data to a DVD 1 as a write-once or re-writable optical recording medium having a write surface such as the one shown in FIG. 1, a read beam generator (not shown) for generating a read beam for reading written information (inclusive of the information data) from the DVD 1 and a four-split optical detector (reference numeral 20 in FIG. 7) are mounted to a write/read head 2 of the information write/read apparatus. Each track GV is shown linearly in FIG. 1, but is wobbled in practice at a frequency corresponding to a rotational speed of the DVD 1. The write beam generator and the read beam generator need not be disposed separately but may be one optical beam generator that generates the write beam at the time of writing and the read optical beam at the time of reading.

Figure 7:
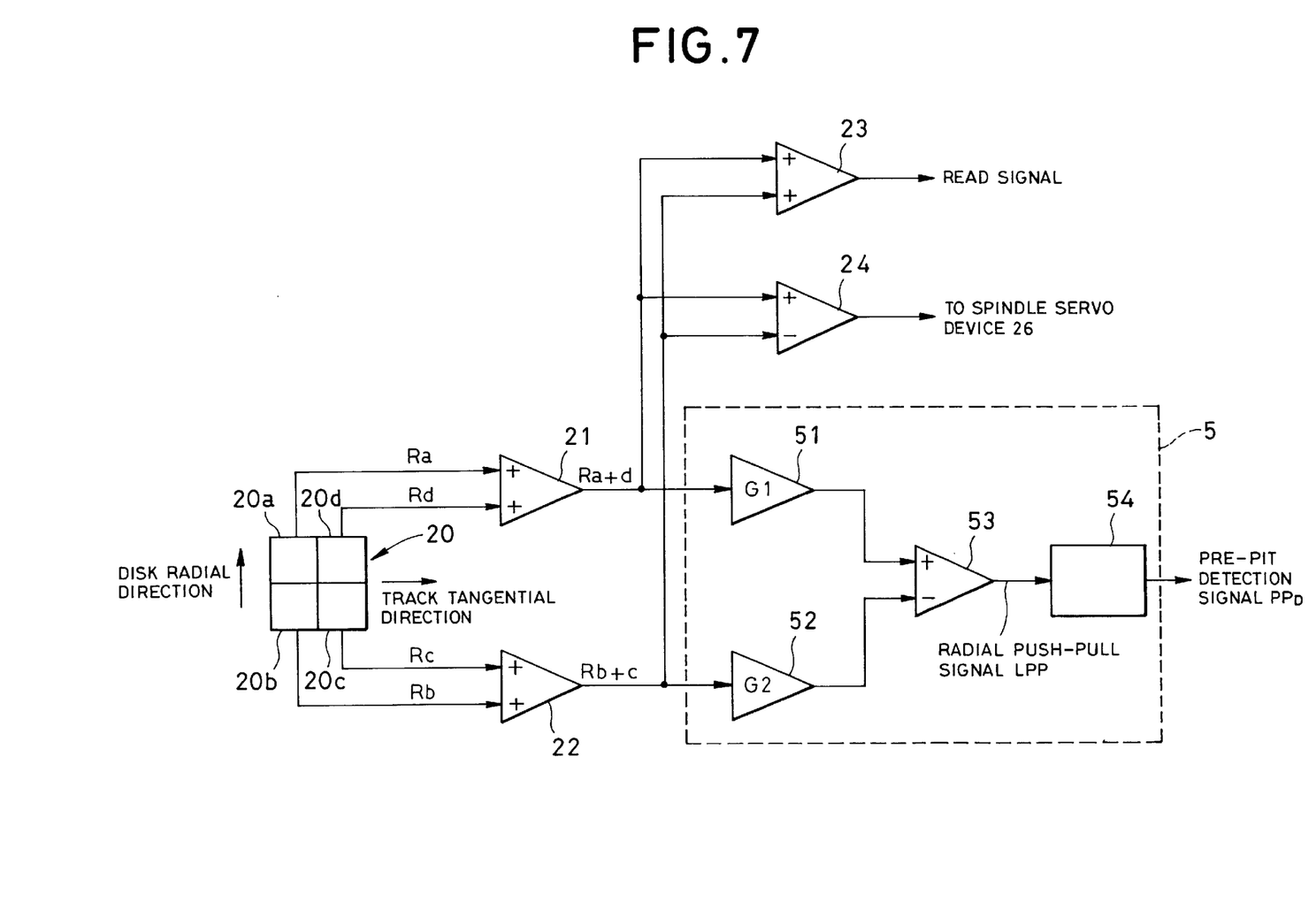
FIG. 7 is a block diagram showing concretely a pre-pit detection circuit.

The read beam generator irradiates the read beam to the DVD 1 that is driven for rotation by a spindle motor 9, and forms information-reading spots on its write surface. As shown in FIG. 7, the four-split optical detector 20 comprises a photo-electric conversion device having four-split light reception surfaces 20a to 20d that are split by the direction extending along the tangent of the information write tracks (groove track GV) and the direction crossing orthogonally the tangent of the write track in the same way as the four-split optical detector shown in FIG. 2. The photo-electric conversion device receives the reflected beam from the information-reading spots of the DVD 1 by its four light reception surfaces 20a to 20d, converts them individually to electric signals and output them as light reception signals Ra to Rd.

A servo controller 4 generates a focusing error signal, a tracking error signal and a slider driving signal on the basis of these light reception signals Ra to Rd. The focusing error signal is supplied to a focusing actuator (not shown) mounted to the write/read head 2. The focusing actuator adjusts the focus of each information-reading spot on the basis of the focusing error signal. The tracking error signal is supplied to a tracking actuator (not shown) mounted to the write/read head 2. The tracking actuator adjusts the formation position of the information-reading spot in the disk radial direction on the basis of the tracking error signal. The slider driving signal is supplied to a slider 100. The slider 100 transfers the write/read head 2 in the disk radial direction at a speed corresponding to the slider driving signal.

The light reception signals Ra to Rd are supplied to a head amplifier 25 having adders 21 to 23 and a subtractor 24. The adder 21 adds the light reception signals Ra and Rd. The adder 22 adds the light reception signals Rb and Rc. In other words, the adder 21 adds the light reception signals Ra and Rd obtained by receiving the beam by the light reception surfaces 20a and 20d of the four-split optical detector 20, and outputs a sum light reception signal $R_{a+d}$. The adder 22 adds the light reception signals Rb and Rc obtained by receiving the beam by the light reception surfaces 20b and 20c of the four-split optical detector 20, and outputs a sum light reception signal $R_{b+c}$.

The adder 23 adds the output signals $R_{a+d}$ and $R_{b+c}$ of the adders 21 and 22. The output signal of the adder 23 is the read signal, that is, a RF signal. The RF signal is supplied to an information data reproduction circuit 30. The information data reproduction circuit 30 digitizes the read signal and sequentially executes a demodulation processing, an error correction processing and various information decoding processing to reproduce and output information data recorded on the DVD 1 (i.e. image data, audio data and computer data).

The subtractor 24 subtracts the output signal $R_{b+c}$ of the adder 22 from the output signal $R_{a+d}$ of the adder 21. The output signal of the subtractor 24 becomes the signal that represents the frequency of the track GV due to wobbling and is supplied to a spindle servo device 26 for the spindle motor 9. The spindle servo device 26 drives and rotates the spindle motor 9 so that the frequency obtained from the output signal of the subtractor 24 becomes a frequency corresponding to a predetermined rotational speed. Since the construction of the spindle servo device 26 is described in Japanese Patent Laid-Open No. 10-283638, its explanation will be hereby omitted.

A pre-pit detection circuit 5 detects the land pre-pits LPP formed on the land tracks LD (prep-pit tracks) of the DVD 1 such as those shown in FIG. 1 on the basis of the output signals of the adders 21 and 22, and supplies the pre-pit detection signals $PP_D$ to a write processing circuit 7.

The write processing circuit 7 recognizes the position at which the write/read head 2 executes writing at the present moment, on the basis of the pre-pit detection signal $PP_D$ or in other words, the position on the groove track GV. The circuit 7 supplies a control signal for allowing the write/read head 2 to jump from the present write position to a desired write position to the servo controller 4. Furthermore, the write processing circuit 7 executes a desired write modulation processing for the information data to be written, generates a write modulation data signal and supplies the signal to the write/read head 2. The read beam generator mounted to the write/read head 2 generates the write beam corresponding to such a write modulation data signal and irradiates the optical beam to the groove track GV of the DVD 1. The heat is transferred to the region on the groove track GV to which the write beam is irradiated, and the information pit is formed in the region.

The construction of the write processing circuit 7, too, is described in Japanese Patent Laid-Open No. 10-283638, and the explanation in further detail will be hereby omitted.

The pre-pit detection circuit 5 comprises an amplifier 51 for amplifying the output signal $R_{a+d}$ of the adder 21, an amplifier 52 for amplifying the output signal $R_{b+c}$ of the adder 22, a subtractor 53 for subtracting the output signal of the amplifier 52 from the output signal of the amplifier 51 to output the difference as a radial push-pull signal PP, and a digitizing circuit 54 for digitizing the output push-pull signal of the subtractor 53 at a predetermined threshold value to generate the pre-pit detection signal $PP_D$ described above, as shown in FIG. 7. The gain G1 of the amplifier 51 is set to a value greater than the gain G2 of the amplifier 52, that is, G1/G2>1. The gain G1 of the amplifier 51 is 1.3, for example, and the gain G2 of the amplifier 52 is 1, for example.

In the pre-pit detection circuit 5 having the above construction, the gain G1 of the amplifier 51 for amplifying the output signal $R_{a+d}$ of the adder 21 is greater than the gain G2 of the amplifier 52 for amplifier the output signal $R_{b+c}$ of the adder 22. Therefore, even if the output signal $R_{a+d}$ of the adder 21 and the output signal $R_{b+c}$ of the adder 22 exist in the same level when the information-reading spot exists on the groove track GV of the write surface, the output signal level of the amplifier 51 is higher than the output signal level of the amplifier 52.

Next, the operation of this embodiment will be explained when the DVD 1 having the information data already written thereon is read, by way of example.

Figure 13A:
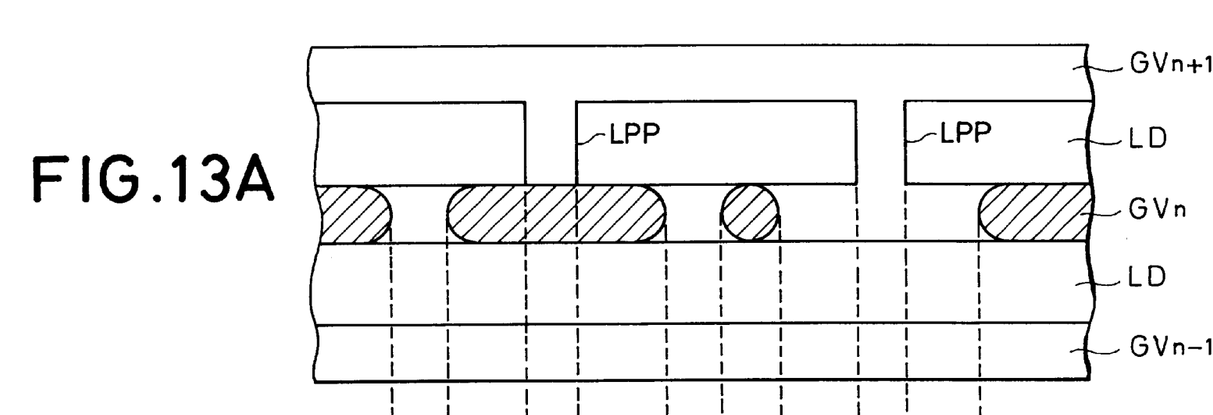
FIGS. 13A and 13B are waveform diagrams showing sum light reception signals $R_{a+d}$ and $R_{b+c}$ when no leak of information data components from adjacent tracks exists.
Figure 13B:
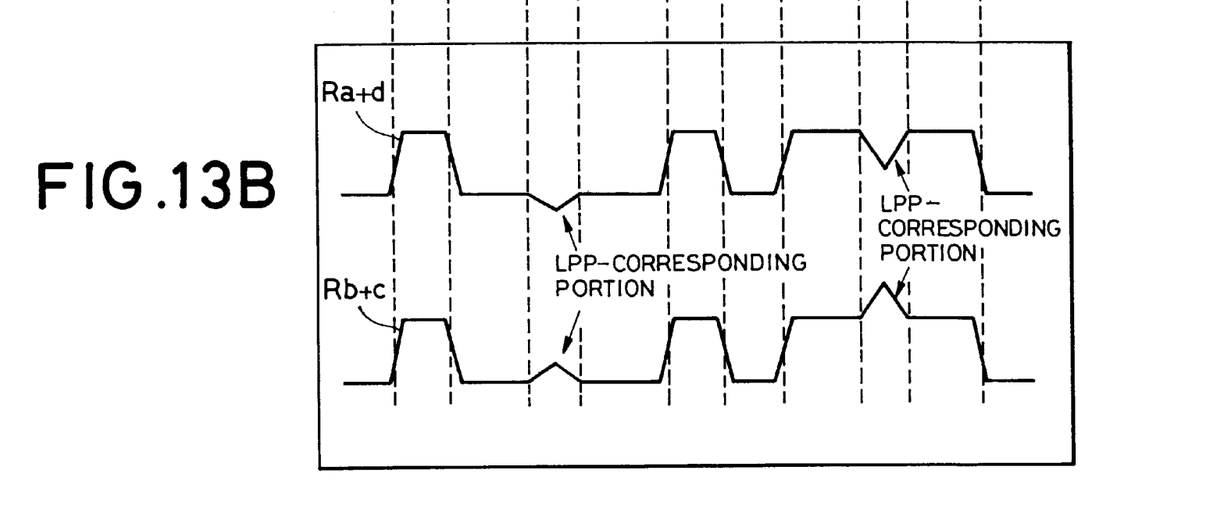
Figure 14A:
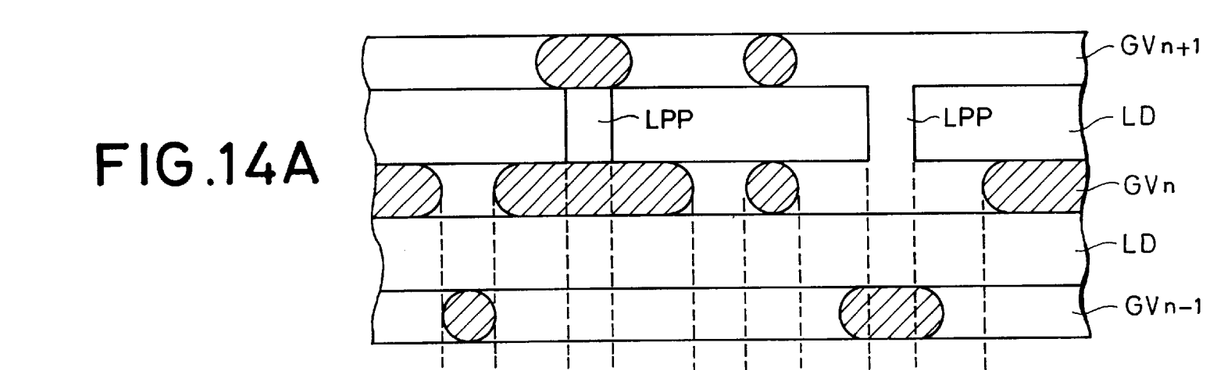
FIGS. 14A and 14B are waveform diagrams showing the signals $R_{a+d}$ and $R_{b+c}$ when the leak of information data components from adjacent tracks exists.
Figure 14B:
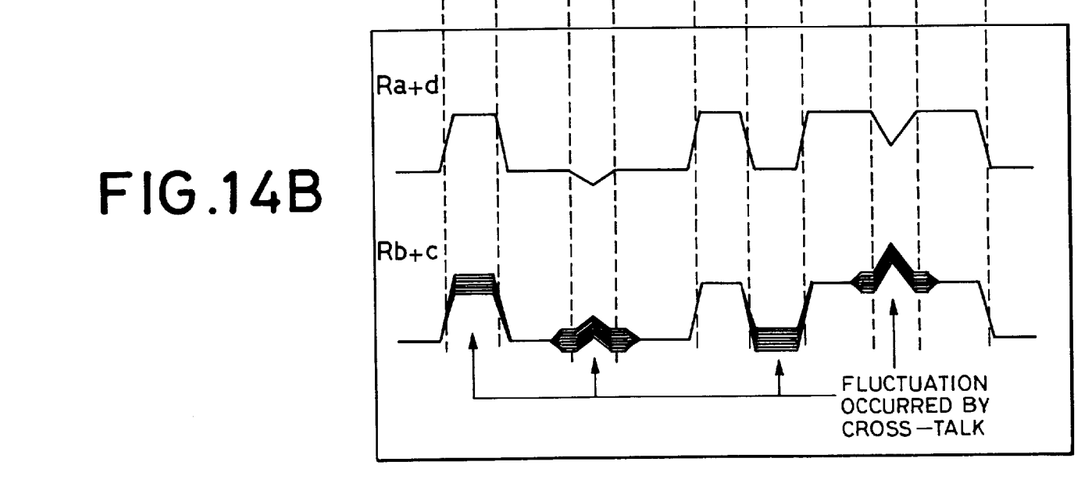

FIGS. 13A and 13B show the waveforms of the signals $R_{a+d}$ and $R_{b+c}$ when the leak of the information components from the adjacent tracks does not exist and the variation of the balance due to the tracking error of the information-reading spot does not exist, either, respectively. FIGS. 14A and 14B show the waveforms of the signals $R_{a+d}$ and $R_{b+c}$ when the leak of the information data components from the adjacent tracks exists due to so-called "cross-talk" and the variation of the balance due to the tracking error of the information-reading spot exists, too, respectively.

In FIG. 13A, the recording marks (pits) by the information data are formed in only the groove track GVn as represented by hatching among the groove tracks GVn−1, GVn and GVn+1. During the read operation of the write mark, the light reception signals Ra to Rd do not at all contain the leak components of the information data from the adjacent groove tracks GVn−1 and GVn+1 and the leak components of the RF signal on the groove track GVn that results from the variation of the balance due to the tracking error of the information-reading spot. The optical beam irradiated is diffracted at the portion of the write mark. Therefore, the light intensity reaching the light reception surfaces 20a to 20d becomes small. On the other hand, the optical beam irradiated is reflected as it is, at portions other than the write mark and reach the light reception surfaces 20a to 20d. Therefore, the light intensity received becomes great. The optical beam irradiated is diffracted at the portion of the land pre-pit LPP at which the land pre-pit LPP exists. Therefore, the light intensity received at the light reception surfaces 20a and 20d by the reflected light at the portions inclusive of the land pre-pit LPP decreases whereas the low intensity received on the light reception surfaces 20b and 20c increases, on the contrary. As a result, the signals $R_{a+d}$ and $R_{b+c}$ change as shown in FIG. 13B. It can be understood from FIGS. 13A and 13B that the decreasing quantity of the light reception intensity of the land pre-pits LPP adjacent to the write mark is smaller than the decreasing quantity of the light reception quantity of the land pre-pit LPP adjacent to the portion where the write mark does not exist. For, the light reception quantity is originally small due to the write mark.

In FIG. 14A, the write marks (hatched portions) of the information data are formed in all of the groove tracks GVn−1, GVn and GVn+1. The leak components of the information data and the leak components of the RF signal on the groove track GVn resulting from the variation of the balance resulting from the tracking error of the information-reading spot are contained in the light reception signals Ra to Rd during the read operation of the write mark of the groove track GVn. The light intensity reaching the light reception surfaces 20a to 20d becomes small at the portion of the write mark of the groove track GVn but becomes great at portions other than the write mark in the same way as in the cases of FIGS. 13A and 13B. The light intensity received on the light reception surfaces 20a and 20d decreases at the position at which the land pre-pit LPP exists, and increases on the light reception surfaces 20b and 20c, on the contrary. Furthermore, when the write marks of the groove tracks GVn−1 and GVn+1 are positioned in the disk radial direction against the read point, the leak components due to cross-talk reach the light reception surfaces 20a to 20d as the light intensity fluctuation. As a result, the signals $R_{a+d}$ and $R_{b+c}$ change as shown in FIG. 14B. FIG. 14B shows the signals $R_{a+d}$ and $R_{b+c}$ with the signal $R_{a+d}$ as the reference. Although only the signal $R_{b+c}$ fluctuates, the signal $R_{a+d}$ also fluctuates in practice due to the leak components.

Figure 15A:
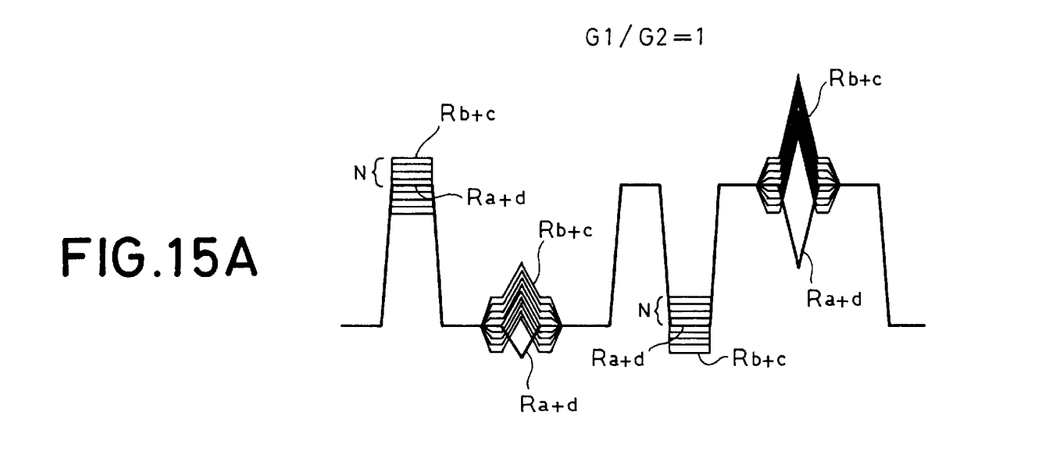
FIGS. 15A and 15B are waveform diagrams showing actual measurement results of the signals $R_{a+d}$ and $R_{b+c}$ and the radial push-pull signal when G1/G2=1.
Figure 15B:
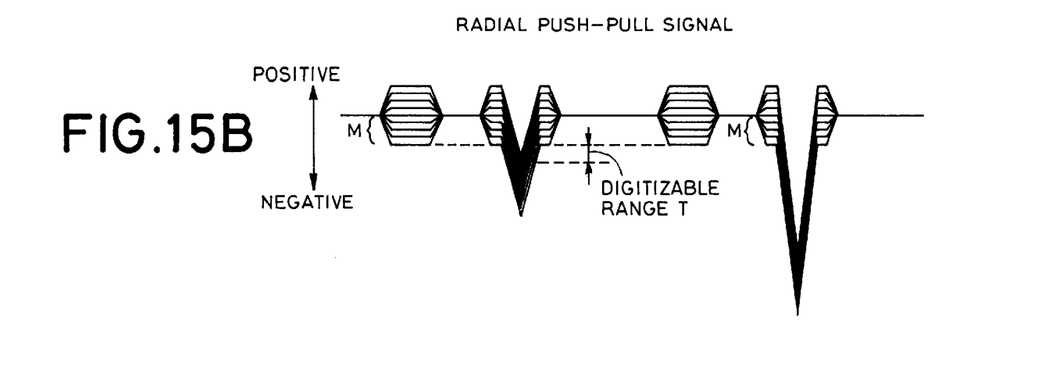

FIG. 15A shows the waveform of the output signal $R_{a+d}$ of the amplifier 51 and the waveform of the output signal $R_{b+c}$ of the amplifier 52 during the read operation of the write mark of the groove track GVn shown in FIG. 14A when G1/G2=1 in the conventional apparatus. FIG. 15B shows the waveform of the radial push-pull signal PP generated from the subtractor 53 of the pre-pit detection circuit 5 in accordance with the output signals $R_{a+d}$ and $R_{b+c}$ shown in FIG. 15A.

Figure 16A:
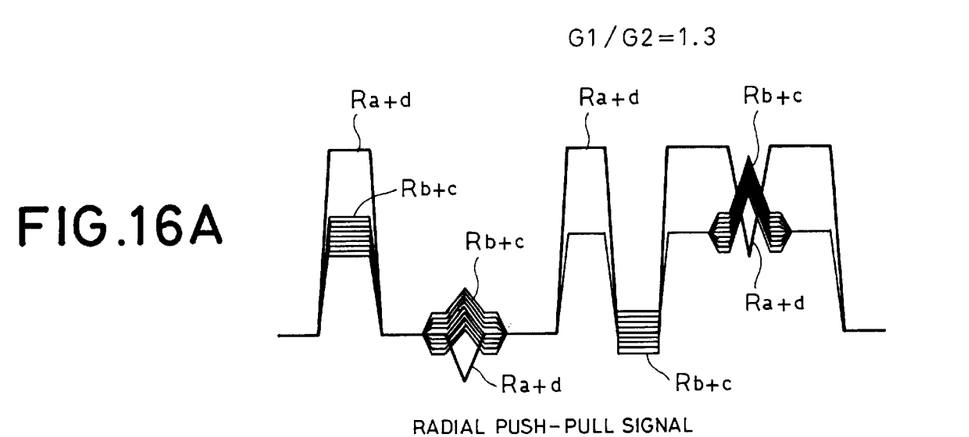
FIGS. 16A and 16B are waveform diagrams showing actual measurement results of the signals $R_{a+d}$ and $R_{b+c}$ and the radial push-pull signal when G1/G2=1.3.
Figure 16B:
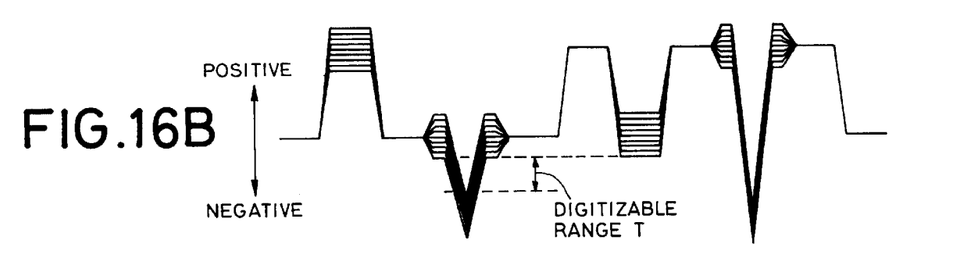

On the other hand, FIG. 16A shows the waveform of the output signal Raid of the amplifier 51 and the waveform of the output signal $R_{b+c}$ of the amplifier 52 during the read operation of the write mark of the groove track GVn shown in FIG. 14A when G1/G2=1.3 in the present invention. FIG. 16B shows the waveform of the radial push-pull signal PP generated from the subtractor 53 of the pre-pit detection circuit 5 in accordance with the output signals $R_{a+d}$ and $R_{b+c}$ shown in FIG. 16A.

In FIGS. 15A, 15B, 16A and 16B, the signals $R_{a+d}$ and $R_{b+c}$ are shown with the signal $R_{a+d}$ as the reference. Therefore, though only the signal $R_{b+c}$ is shown fluctuating, the signal $R_{a+d}$, too, fluctuates in practice in accordance with the leak components.

When G1/G2=1, the signal $R_{b+c}$ becomes greater in some cases than the signal $R_{a+d}$ as indicated by symbol N in FIG. 15A. Therefore, the influences of the portion N appear in the radial push-pull signal PP as indicated by symbol M in FIG. 15B. The portion M has the waveform that protrudes greatly towards the detection level side (to the negative side in FIG. 15B) of the land pre-pit LPP and narrows the digitizable range T. When G1/G2=1.3, on the other hand, the signal $R_{a+d}$ is greater than the signal $R_{b+c}$ with the exception of the portion corresponding to the land pre-pit LPP as shown in FIG. 16A. Therefore, the signal components such as M do not appear greatly towards the negative side in the radial push-pull signal PP with the exception of the portion corresponding to the land pre-pit LPP, as shown in FIG. 16B. On the contrary, the portion of the signal $R_{b+c}$ containing the leak components moves and appears on the positive side of the radial push-pull signal. Therefore, the digitizable range T can be expanded.

Figure 17A:
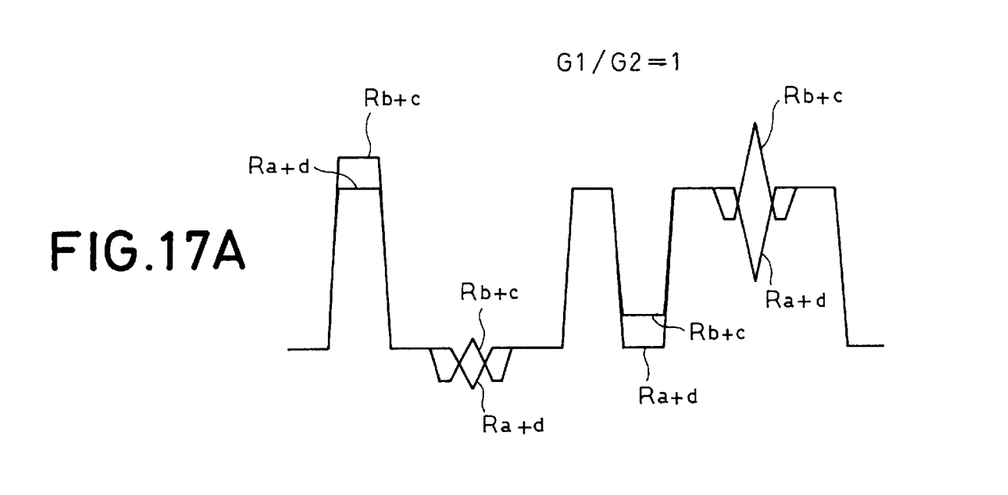
FIGS. 17A and 17B are waveform diagrams showing the signals $R_{a+d}$ and $R_{b+c}$ and the radial push-pull signal for one line of the waveform of the signal $R_{b+c}$ in FIG. 15A.
Figure 17B:
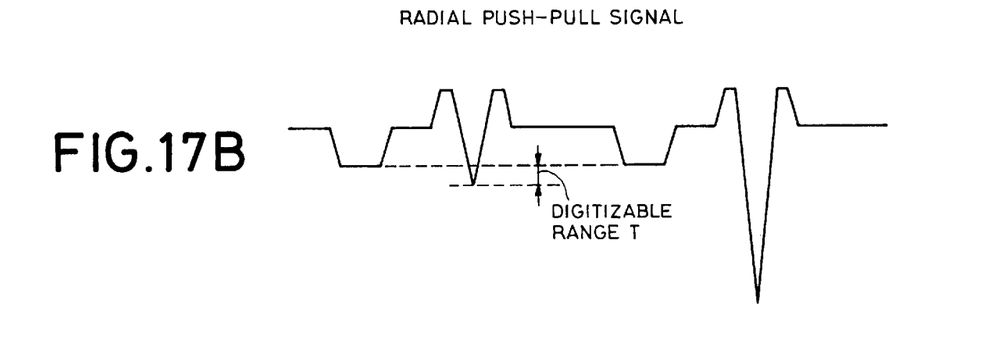

In order to have the explanation of FIGS. 15A, 15B, 16A and 16B more easily understood, FIG. 17A shows only one line that exerts the worst influences on the digitizable range T of the fluctuation waveform of the output signal $R_{b+c}$ of the amplifier 52 in FIG. 15A. The drawing shows also the waveform of the output signal $R_{a+d}$ of the amplifier 51. FIG. 17B shows the waveform of the radial push-pull signal PP generated from the subtractor 53 of the pre-pit detection circuit 5 in accordance with the signals $R_{a+d}$ and $R_{c+d}$ shown in FIG. 17A.

Figure 18A:
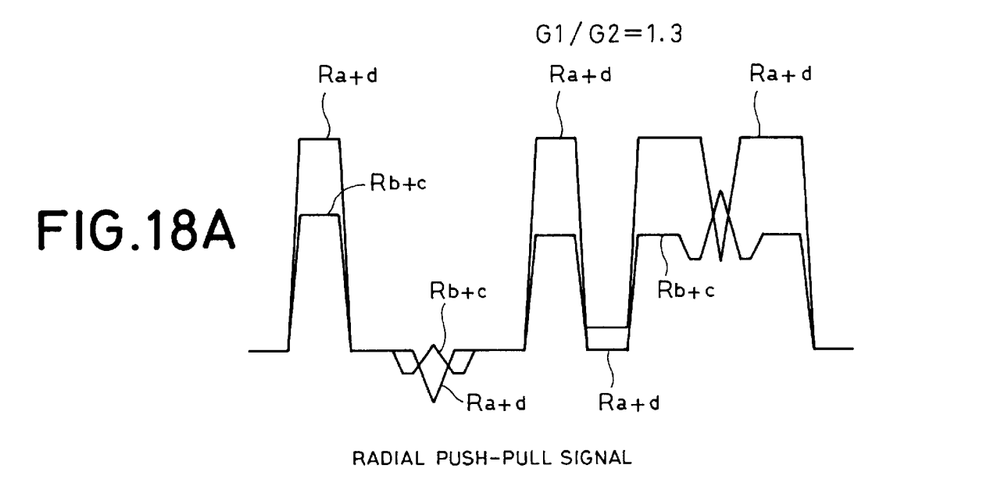
FIGS. 18A and 18B are waveform diagrams showing the signals $R_{a+d}$ and $R_{b+c}$ and the radial push-pull signal for one line of the waveform of the signal $R_{b+c}$ in FIG. 16A.
Figure 18B:
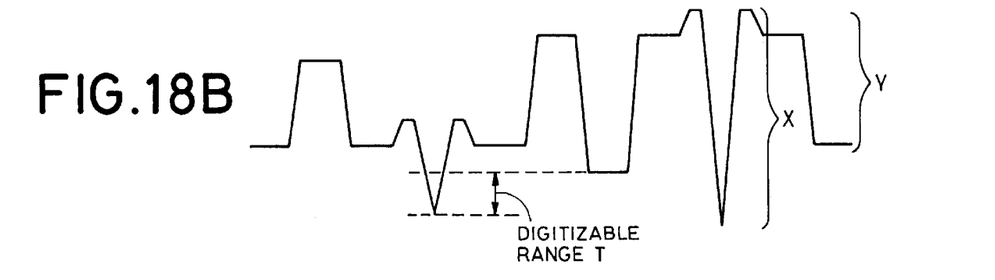

Similarly, FIG. 18A shows only one line that exerts the worst influences on the digitizable range of the fluctuation waveform of the output signal $R_{b+c}$ of the amplifier 52 shown in FIG. 16A with the waveform of the output signal $R_{a+d}$ of the amplifier 51. FIG. 18B shows the waveform of the radial push-pull signal PP generated from the subtractor 53 of the pre-pit detection circuit 5 in accordance with the signals $R_{a+d}$ and $R_{b+c}$ shown in FIG. 18A.

As can be appreciated from FIGS. 17A, 17B, 18A and 18B, the ratio G1/G2=1.3 can expand the digitizable range T in comparison with G1/G2=1.

The explanation of the operation given above deals with the fluctuation of the light intensity due to the leak of the information data components from the adjacent tracks by way of example. However, the explanation also holds true of the fluctuation of the light intensity resulting from the tracking error of the information-reading spot.

When the gain G1 of the amplifier 51 is increased excessively when compared with the gain G2 of the amplifier 52, the portion X of the radial push-pull signal PP, that corresponds to the land pre-pit LPP of the radial push-pull signal PP shown in FIG. 18B, moves towards the positive side, and its distal end is included in the signal range Y corresponding to the portion at which the write mark does not exist. In consequence, the digitizable range T becomes narrower. This is the same as the case where AR drops to 0 when the ratio G1/G2 becomes excessively great in the relational curve between G1/G2 and AR shown in FIG. 12. For the reason, G1/G2=approx. 1.0 to 1.6 is required.

Figure 9:
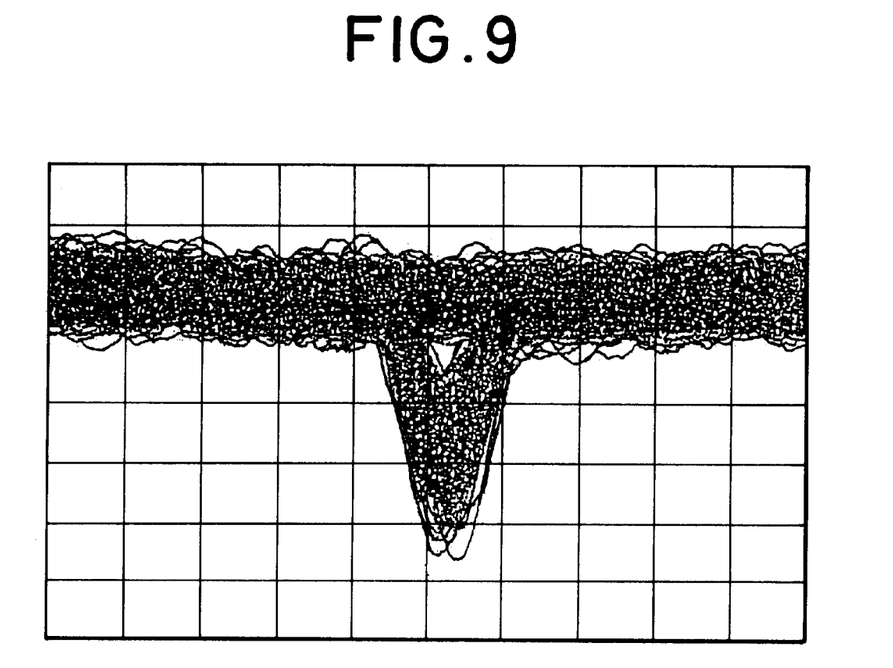
FIG. 9 is a waveform diagram showing an actual measurement result of the radial push-pull signal when G1/G2=1.
Figure 10:
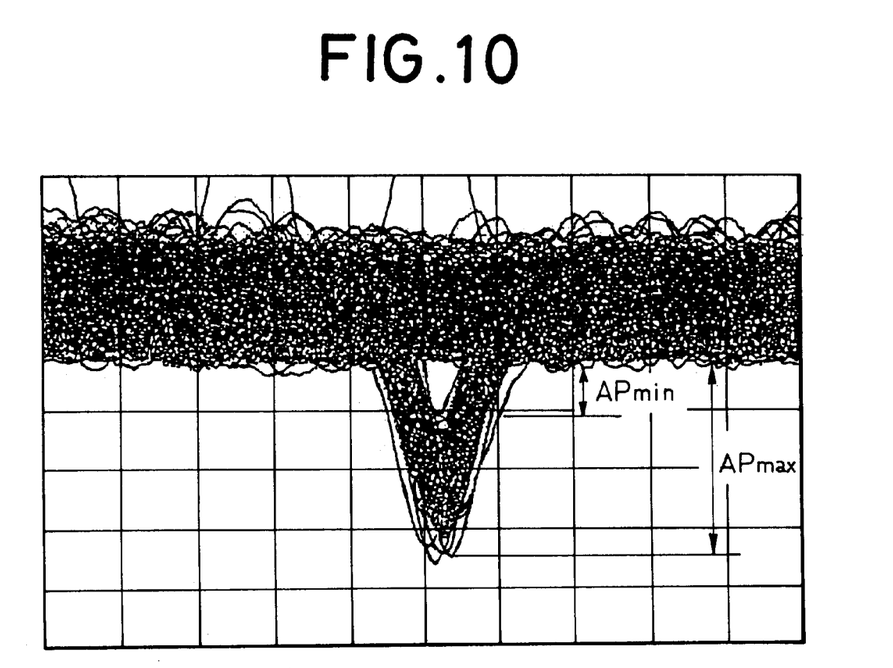
FIG. 10 is a waveform diagram showing an actual measurement result of the radial push-pull signal when G1/G2=1.3.

FIGS. 9 and 10 show the waveforms of the radial push-pull signal PP obtained by the actual measurement. The waveforms shown in FIGS. 9 and 10 represent a large number of sweep lines superposed with one another as the groove tracks GV containing the land pre-pit LPP are detected again and again. FIG. 9 shows the case of G1/G2=1 in the same way as in the prior art, and FIG. 10 shows the case of G1/G2=1.31. In FIGS. 9 and 10, when the minimum value of the push-pull signal PP for the land pre-pit LPP is APmin and its maximum value is APmax, the minimum value APmin, in particular, becomes greater in the waveform of G1/G2=1.31 than in the waveform of G1/G2=1 shown in FIG. 9. It can be thus unterstood that the digitizable range becomes broader.

In other words, it is necessary to increase the ratio of the minimum value APmin to the maximum value APmax, i.e. AR (Aperture Ratio)=APmin/APmax, to expand the digitizable range.

Figure 11:
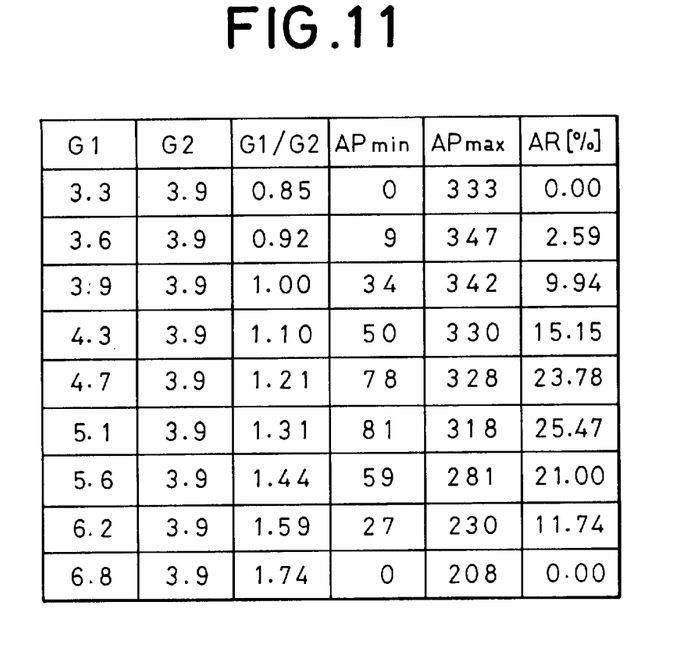
FIG. 11 is a table showing G1, G2, G1/G2, APmax, APmin and AR when the gain G1 is changed.
Figure 12:
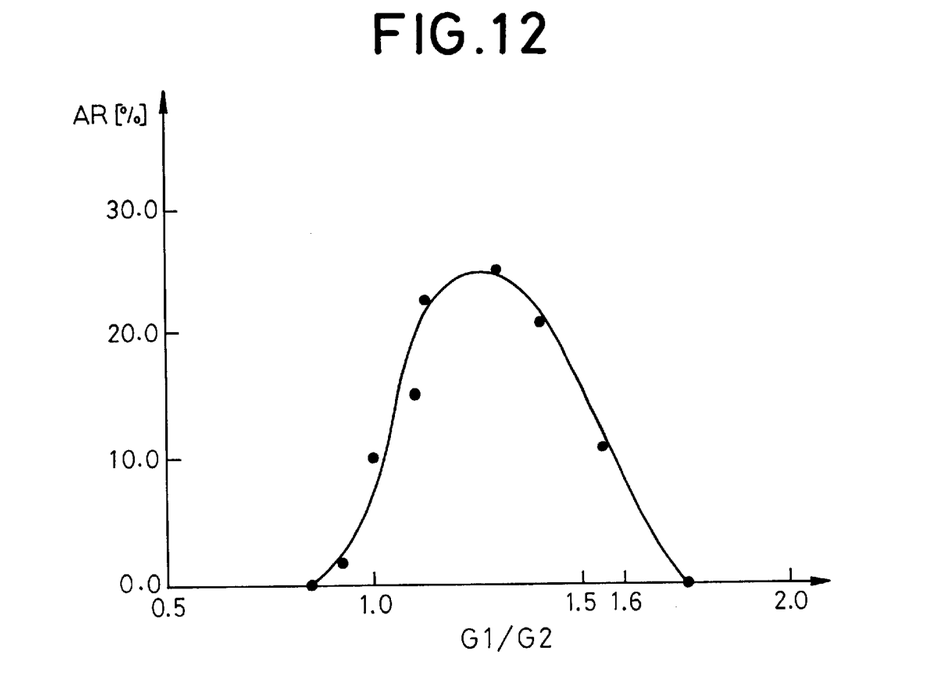
FIG. 12 is a diagram showing a characteristic curve that shows the relationship between the gain ratio G1/G2 and AR.

FIG. 11 shows the gain G1, the gain G2, the ratio G1/G2, the minimum value APmin, the maximum value APmax and AR=APmin/APmax when the minimum value APmin and the maximum value APmax are measured by changing the gain G1 of the amplifier 51 while the gain G2 of the amplifier 52 is kept constant. FIG. 12 is a graph showing characteristic curve the relationship between G1/G2 and AR obtained by such a measurement. The standard of the DVD-R stipulates the condition that the disk satisfies AR>10%. Even if certain kinds of disks cannot easily satisfy the condition when G1/G2=1 as in FIG. 12, the disks can acquire the numeric values better than AR of the original disks when G1/G2 is set to the range of approx. 1.0 to 1.6. As can be seen from these FIGS. 11 and 12, AR attains the maximum value of about 25% when G1/G2=about 1.3 and thus satisfies the condition of AR>10%. Therefore, this embodiment employs the gains G1 and G2 satisfying the relation G1/G2=about 1.3.

Figure 8:
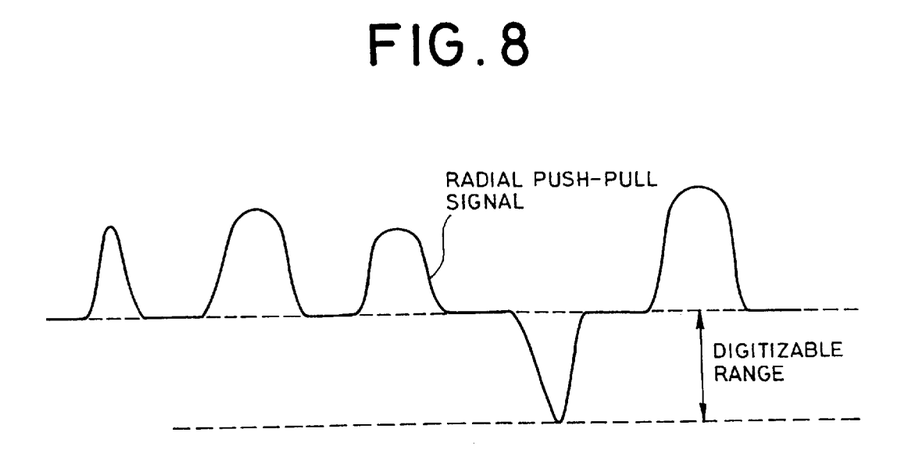
FIG. 8 is a waveform diagram showing a radial push-pull signal obtained by the pre-pit detection circuit shown in FIG. 7.

As described above, when the digitizable range can be expanded, the dynamic range can be expanded when the digitization circuit 54 executes digitization at the predetermined threshold value Th (as shown in FIG. 8 in comparison with the prior art technology shown in FIG. 5). In consequence, detection accuracy of the land pre-pit detection signal $PP_D$ can be improved.

Since the digitizable range can be expanded, the predetermined threshold value can be set with a sufficient margin when digitization is conducted. Thus, the erroneous detection of the land pre-pit LPP can be prevented even when the focusing error, the tracking error and the increase of the cross-talk due to the tilt exist.

The embodiment described above represents the case wherein the DVD 1 to which the information data has already been written is read. However, this embodiment can similarly generate a radial push-pull signal PP having a broad digitizable range when the information data is written to the DVD 1 to which the information data is not yet written. To detect the address to be written on the DVD 1, it is customary to detect the land pre-pit LPP that is formed in advance on the DVD 1. During the write operation, however, the track to be written and the written tracks adjacent to the former track exist. For the reason, the information data components of the written adjacent tracks leak into the radial push-pull signal PP. In such a case, too, the present invention can generate a radial push-pull signal PP having a broad digitizable range. In the case of an overwritable DVD (such as DVD-RW), the information data components from the written adjacent tracks and the leak component of the RF signal on the track during writing, that results from the collapse of the balance due to the tracking error of the information-reading spot, leak into the radial push-pull signal PP when the information data is overwritten into a part of the track that has already been written. However, the present invention can generate a radial push-pull signal PP having a broad digitizable range with hardly any influences of the leak components.

In the embodiment described above, the gain G1 of the amplifier 51 for amplifying the output signal of the adder 21 is set to a greater gain than the gain G2 of the amplifier 52 for amplifying the output signal of the adder 22, but the arrangement is not restrictive. If the gain G2=1, for example, the amplifier 52 need not be disposed. The amplifiers 51 and 52 need not always be disposed at the output stage of the adders 21 and 22 but may be disposed at their input stage. In other words, (not shown) an amplifier Aa for amplifying the light reception signal Ra, an amplifier Ab for amplifying the light reception signal Rb, an amplifier Ac for amplifying the light reception signal Rc at the same gain as that of the amplifier Ab and an amplifier Ad for amplifying the light reception signal Rd at the same gain as that of the amplifier Aa are provided in the case. The gain of each amplifier Aa, Ad is set to a grater gain than that of each amplifier Ab, Ac.

Further, when the gains are set to G1/G2=1.3, G2 may be set to G2=1/1.3 by setting G1 to G1=1.

The embodiment described above uses the four-split optical detector, but it may use an optical detector having light reception surfaces split into two surfaces in the tangential direction of the tracks. In the case, the amplifiers 21 and 22 need not be disposed.

As described above, pre-pit detector of the present invention can expand the digitizable range of the radial push-pull signal even when the leak of the information data components from the adjacent tracks or the variation of the balance due to the tracking error of the information-reading spot exists. Since setting of the threshold value for digitization becomes easy, the present invention can correctly detect the pre-pit.

What is claimed is:

1. A pre-pit detector for an optical recording medium including a write surface on which an information write track for forming information pits carrying information data and pre-pit track previously having a plurality of pre-pits carrying information associated with the information write track are repeatedly formed in pairs, comprising:

optical detection means having light reception surfaces split as first and second light reception surfaces in a tangential direction of said track, for receiving a reflected light of an optical beam irradiated to said write surface on said first and second light reception surfaces so as to output first and second optical detection signals corresponding to light reception intensities of said first and second light reception surfaces, and for receiving the reflected beam from said pre-pit track pairing up with said information write track to which the optical beam is irradiated, on said first light reception surface;

a first amplifier for amplifying said first optical detection signal with a first gain;

a second amplifier for amplifying said second optical detection signal with a second gain smaller than said first gain;

subtraction means for computing a difference between output signals of said first and second amplifiers; and digitization means for digitizing the output signal of said subtraction means so as to generate said pre-pit detection signal, wherein a ratio of said first gain to said second gain (said first gain/said second gain) is set so that a ratio of the minimum value to the maximum value (minimum value×100/maximum value) of the output signal of said subtraction means corresponding to said pre-pit becomes greater than that when the ratio of said first gain to said second gain is one.

2. A pre-pit detector for an optical recording medium including an information write track and a plurality of pre-pits carrying information associated with the information write track, comprising:

an optical detector having light reception surfaces split as first and second light reception surfaces in a tangential direction of said track, for outputting first and second light reception signals;

a subtraction circuit for computing a difference between the first and second reception signals to output a radial push-pull signal; and a digitizing circuit for digitizing the radial push-pull signal to generate a pre-pit detection signal, wherein said subtraction circuit adjusts amplitude levels of the first and second light reception signals between which the difference is computed, at respective gains which are different from each other, so as to expand a digitizable range of the radial push-pull signal.

3. A pre-pit detector according to claim 2, wherein said subtraction circuit comprises:

a first amplifier for amplifying said first optical detection signal with a first gain;

a second amplifier for amplifying said second optical detection signal with a second gain which is different from said first gain;

subtraction means for computing a difference between output signals of said first and second amplifiers.

4. A pre-pit detector according to claim 3, wherein a ratio of said first gain to said second gain is 1.3.

* * * * *